(12) United States Patent
Sjöbäck

(10) Patent No.: US 6,779,465 B1
(45) Date of Patent: Aug. 24, 2004

(54) CAR BODY AND A METHOD FOR PRODUCING A BEAM

(75) Inventor: Conny Sjöbäck, Kalmar (SE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 09/980,684

(22) PCT Filed: Jun. 6, 2000

(86) PCT No.: PCT/SE00/01167
§ 371 (c)(1),
(2), (4) Date: Mar. 6, 2002

(87) PCT Pub. No.: WO00/76821

PCT Pub. Date: Dec. 21, 2000

(30) Foreign Application Priority Data

Jun. 10, 1999 (SE) .................................................. 9902172

(51) Int. Cl.⁷ .............................................. B61D 17/04
(52) U.S. Cl. ...................... 105/396; 105/409; 52/573.2; 296/204; 410/112
(58) Field of Search ................................ 105/409, 396, 105/397, 401, 407, 418, 238.1, 344, 345, 322, 332, 325; 296/205, 29, 203, 191, 193.06, 203.03, 203.01; 410/112, 113, 104, 106; 72/181, 365.2

(56) References Cited

U.S. PATENT DOCUMENTS

| | | | |
|---|---|---|---|
| 3,853,071 A | * 12/1974 | Snyder et al. ............... 105/409 |
| 4,230,361 A | 10/1980 | Nachbur et al. | |
| 4,238,550 A | * 12/1980 | Burgess et al. .............. 428/586 |
| 4,319,528 A | * 3/1982 | Gutridge et al. ............. 105/397 |
| 4,505,143 A | * 3/1985 | Knudson ...................... 72/187 |
| 4,678,226 A | * 7/1987 | Ishizuka et al. ......... 296/203.03 |
| 5,056,348 A | * 10/1991 | Albrecht et al. .............. 72/177 |
| 5,287,813 A | * 2/1994 | Hanni et al. ................. 105/396 |
| 5,640,869 A | * 6/1997 | Takeda et al. ................. 72/129 |
| 5,784,970 A | * 7/1998 | Fehr et al. .................... 105/401 |
| 5,926,930 A | * 7/1999 | Tamura et al. .............. 29/33 D |
| 6,102,472 A | * 8/2000 | Wallstrom ............. 296/203.01 |
| 6,327,981 B1 | * 12/2001 | Norregaard et al. ........ 105/396 |
| 6,387,469 B1 | * 5/2002 | Ristow et al. ............... 428/116 |

FOREIGN PATENT DOCUMENTS

| | | | |
|---|---|---|---|
| DE | 3732086 A1 | * 4/1989 | ........... B61D/17/00 |
| DE | 37 32 086 A1 | * 4/1989 | |
| FR | 846659 | 9/1939 | |
| NO | 175047 | 5/1994 | |
| SE | 439912 | 7/1985 | |

* cited by examiner

Primary Examiner—Frantz F. Jules
(74) Attorney, Agent, or Firm—Swidler Berlin Shereff Friedman, LLP

(57) ABSTRACT

A car body for a rail vehicle including a plurality of beams (1) arranged to carry one or more wall elements (3–5). At least one of said beams (1) includes an attaching member (6), extending substantially in the longitudinal direction of the beam, for engagement with at least a part of one or more components intended to be supported by the beam (1).

6 Claims, 2 Drawing Sheets

CAR BODY AND A METHOD FOR PRODUCING A BEAM

THE BACKGROUND OF THE INVENTION AND PRIOR ART

The present invention refers to a car body for a rail vehicle. In particular, it refers to a car body including a number of beams arranged to carry one or more wall elements. Furthermore, the invention refers to a method for manufacturing of a beam to the car body of a vehicle.

The term "wall elements" should be considered in a wide sense and may include a floor, a roof, and side walls of the vehicle. In particular, they include sheets which are supported by beams.

The term car body should be seen in a wide meaning and includes all types of shell constructions arranged to surround and define the interior of a vehicle.

The term "beam" concerns all the reinforcing and supporting beams or braces which are arranged to carry the floor, the walls, and the roof of the car body and which, in addition, can be utilized as a support for further components in the car body.

The invention is particularly advantageous for car bodies for train wagons, and will therefore for the purpose of exemplifying be described in such a context. In particular, the invention is applicable to train wagons, which include car bodies made of steel or aluminum and which include a framework of beams and an outer sheet casing.

Further component or systems in such car bodies, such as interior equipment, channels, cabling, floor equipment, etc., are attached to the beams via attaching elements, which are attached to the beams by welding, riveting, or using threaded fasteners. The arrangement of such joints is a labor intensive and costly factor for the manufacture of such car bodies. Furthermore, welded joints cause irregularities in the even surfaces of, for instance, the wall elements and components attached to a beam. Such irregularities can include buckling caused by the heat from the welded joint and/or shape changes of one or more beams and the wall element/s attached thereto. Thus, a reduction of the number of such joints is desired also for aesthetic reasons. Moreover, irregularities caused by welded joints result in inexact tolerances of the walls, for instance, so that problems can occur with the fitting between different parts such as walls and floors.

SUMMARY OF THE INVENTION

An object of the present invention is to provide a car body which has such a design that it allows an easy and reliable mounting of different components, such as interiors, channels, cabling, bogie wagon equipment etc. at one or more beams in the car body. Individual beams shall be so designed that welded, riveted, and screwed joints can be replaced by such joints that are well suited for their purpose to fix said components to the beams, and so that damage to the beams, the wall elements and the further components is avoided in the best possible way during the mounting. Furthermore, the beams should have a design allowing a totally or almost totally automatized, industrial manufacturing of those to a low cost.

These objects are achieved by a car body of the initially defined kind which is characterized in that at least one of said beams includes an attaching member extending substantially in the longitudinal direction of the beam for engagement with at least a part of one or more components intended to be supported by the beam. As a part of said components, also intermediate attaching elements are included, for instance attaching rulers for standardized profile rail systems, such as C-rail systems. A further benefit achieved thanks to the invention is that such attaching elements easily can be positioned practically anywhere along the attaching member and also easily removed if required without leaving any considerable traces.

The attaching member defines preferably a recess or a bulge and can be accomplished during manufacturing of the beam by, for instance, extrusion or rolling of the beam. Thanks to the engagement between the recess/bulge and said part of the component, the requirement of further joints between the beam and the component in question is reduced. According to a preferred embodiment, the recess or the bulge and said part of the component or components have such a complementary shape that a form locking is achieved between the recess/bulge and said part at said engagement. The need for further joints between the beam and the component in question is therefore totally or almost totally eliminated. The form locking includes, for instance, that the component or said part of it, when being in engagement with the beam, clamps to the beam, for instance by effect of a nut or a snap mechanism.

According to a further preferred embodiment, the attaching member is an integrated part of the beam. Joints for fixing the attaching member to the beam are therefore not needed, and an aesthetically attractive beam, free from splicing, is utilized.

According to a further preferred embodiment, the beam includes a sheet with a substantially constant thickness, and the recess is defined by the shape of the sheet. In this way, the attaching member in the form of the recess/bulge can be accomplished by, for instance, rolling of the sheet, and accordingly at a relatively low cost. The manufacturing of the beam does not need to be done by mechanical tooling (milling or the like) for the accomplishment of the recess/bulge, and accordingly unnecessary losses of material are avoided.

A further object of the invention is to provide a method for manufacturing of a beam for a car body of a vehicle, which method to a great extent should be suited for automatic, industrial manufacturing and results in a beam with such a design that the need for welded, riveted, and screwed joints, etc. for fixing further components to the beam can be considerably reduced. This object is achieved according to the invention by a method of the initially defined kind, characterized in that an attaching member, running substantially in the longitudinal direction of the beam, is arranged in the beam. The beam is elongated when it is ready for use, and the attaching member can easily be accomplished in connection with the extrusion or rolling of the beam to its final shape. The beam with the attaching member in the form of the recess/bulge can define a standardized profile rail and work as an engaging member relative to further components, such as interiors, cabling, bogie wagon equipment, etc. in the car body. Attaching elements for standardized profile rail systems can in the first place be used for engagement with the attaching member. These attaching elements then form a part of said components and can easily be moved from a position to another and be completely removed for moving or removal of said components.

According to a preferred embodiment, the beam includes a sheet and the attaching member is accomplished by rolling of the sheet. Expensive mechanical tooling, such as milling, for accomplishment of the attaching member is thereby avoided. Practically no losses of material occur.

According to a further preferred embodiment, the attaching member, when it defines a recess, has a substantially T-shaped cross-section. By a corresponding design of a part of a component to be fixed to the beam, a very firm engagement between the beam and the component can be achieved. The orifice of the recess towards the long side of the beam can be made relatively narrow, and the arrangement of the recess does not need to entail any weakening of the beam. An attaching element or a part of a component to be attached to the beam, may have a foot member, which is led into the T-groove and a nut member for fixing the foot member in the groove, which fixing is known per se.

Further features and advantages of the present invention will be seen in the appended claims and the detailed description.

BRIEF DESCRIPTION OF THE DRAWINGS

An embodiment of the invention will here be described for the purpose of exemplifying with reference to the attached drawings, in which.

DETAILED DESCRIPTION OF AN EMBODIMENT

Figure 2:
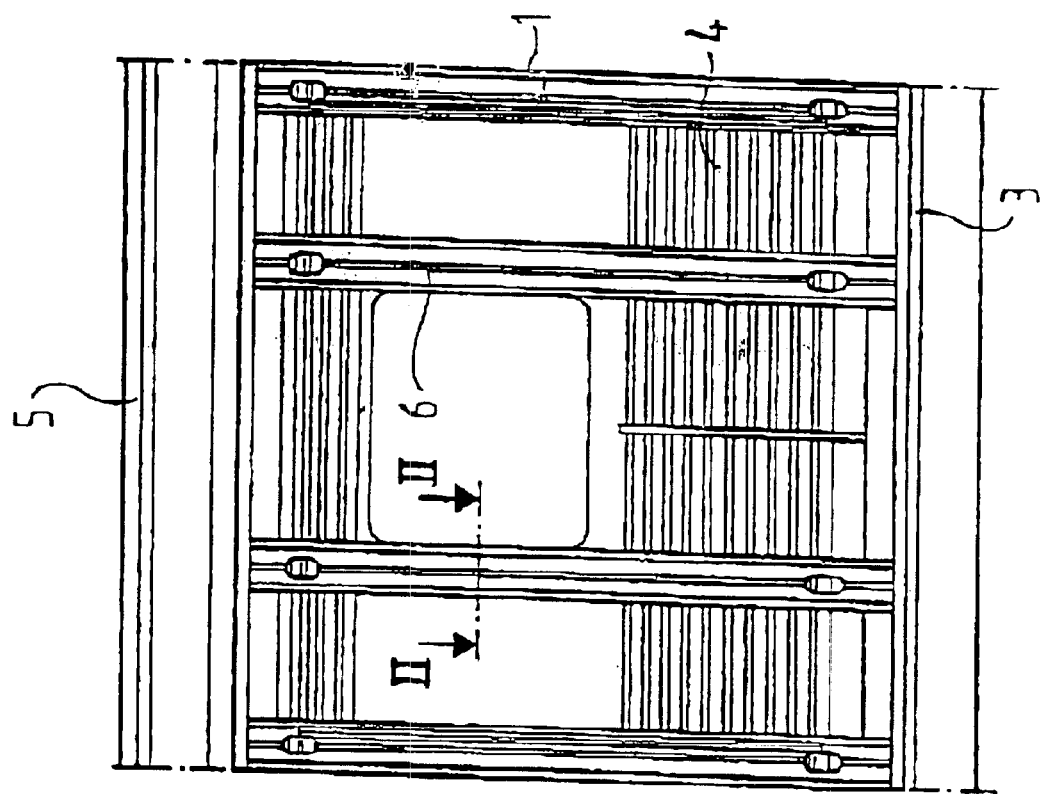
FIG. 2 is a side-view according to I—I in FIG. 1 of a section of the car body.
Figure 1:
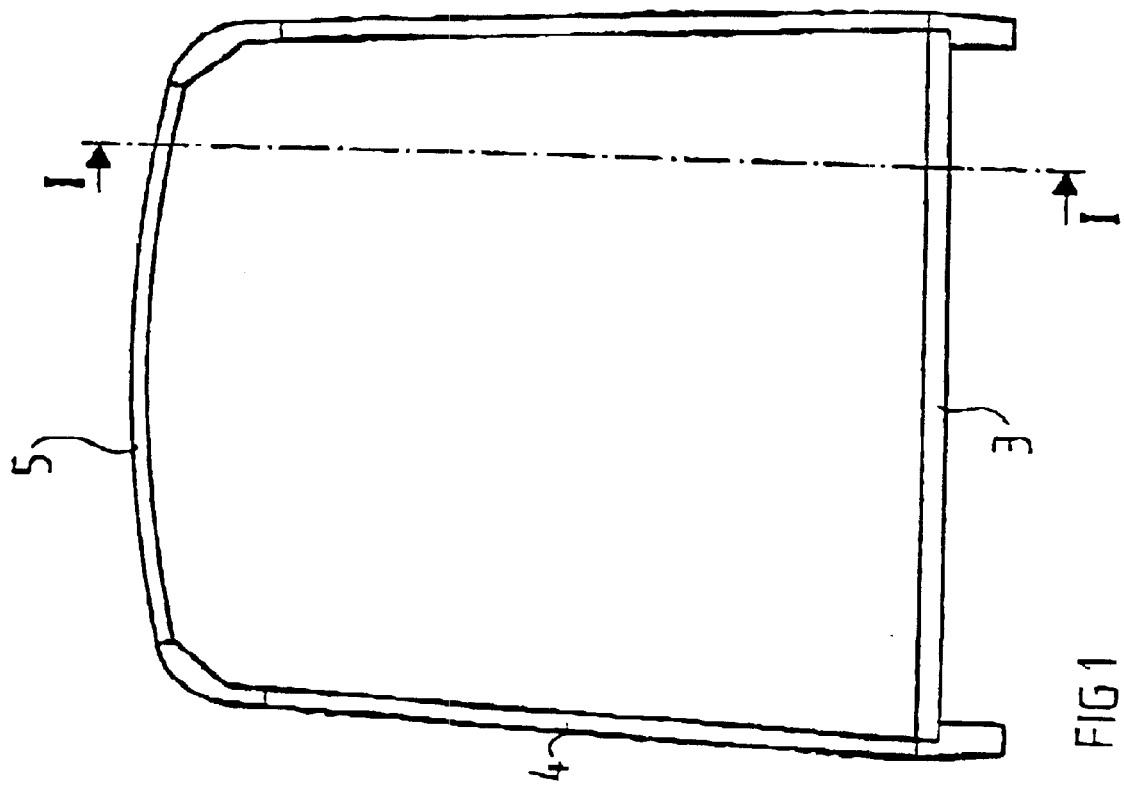
FIG. 1 is a schematical cross-sectional view of a car body according to the invention.

FIG. 1 discloses a cross-section of a car body for a vehicle, in this case a rail vehicle, namely a train wagon. The car body includes a number of beams 1, which form a support for wall elements in the form of sheets 3, 4 and 5, which surround and define an inner space of the car body. Said sheets form the floor 3, the side walls 4, and the roof 5 of the vehicle.

Each beam 1 includes a sheet with a substantially constant thickness. The sheet is formed so that it defines a recess 6 turned away from or, as in this cases, towards the inner space of the car body. The recess 6 is arranged to engage at least one part of one or more components (not shown), and thereby support them. Such components may, for instance, include interiors, such as tables, chairs, shelves, or channels, or the like, for receiving cabling etc.

The recess 6 extends with a substantially constant cross-section in the longitudinal direction of the beam 1 and along a considerable part, preferably the whole, of its length and discloses an opening 7 which has a smaller width than the space 8 defined by the recess 6 inside the opening 7. The recess 6 is accomplished by rolling of the sheet which shall define the beam 1. The beam 1 is preferably made of steel or another for the purpose suitable material, preferably aluminum.

It is also possible to manufacture the beam 1 from a more workable material than steel. The desired recess 6 can be accomplished by, for instance, extrusion of such a workable material, such as aluminum. Furthermore, such an extruded profile can be given a varying wall thickness to meet the requirements for strength, design, etc. in the specific case of construction.

Figure 3:
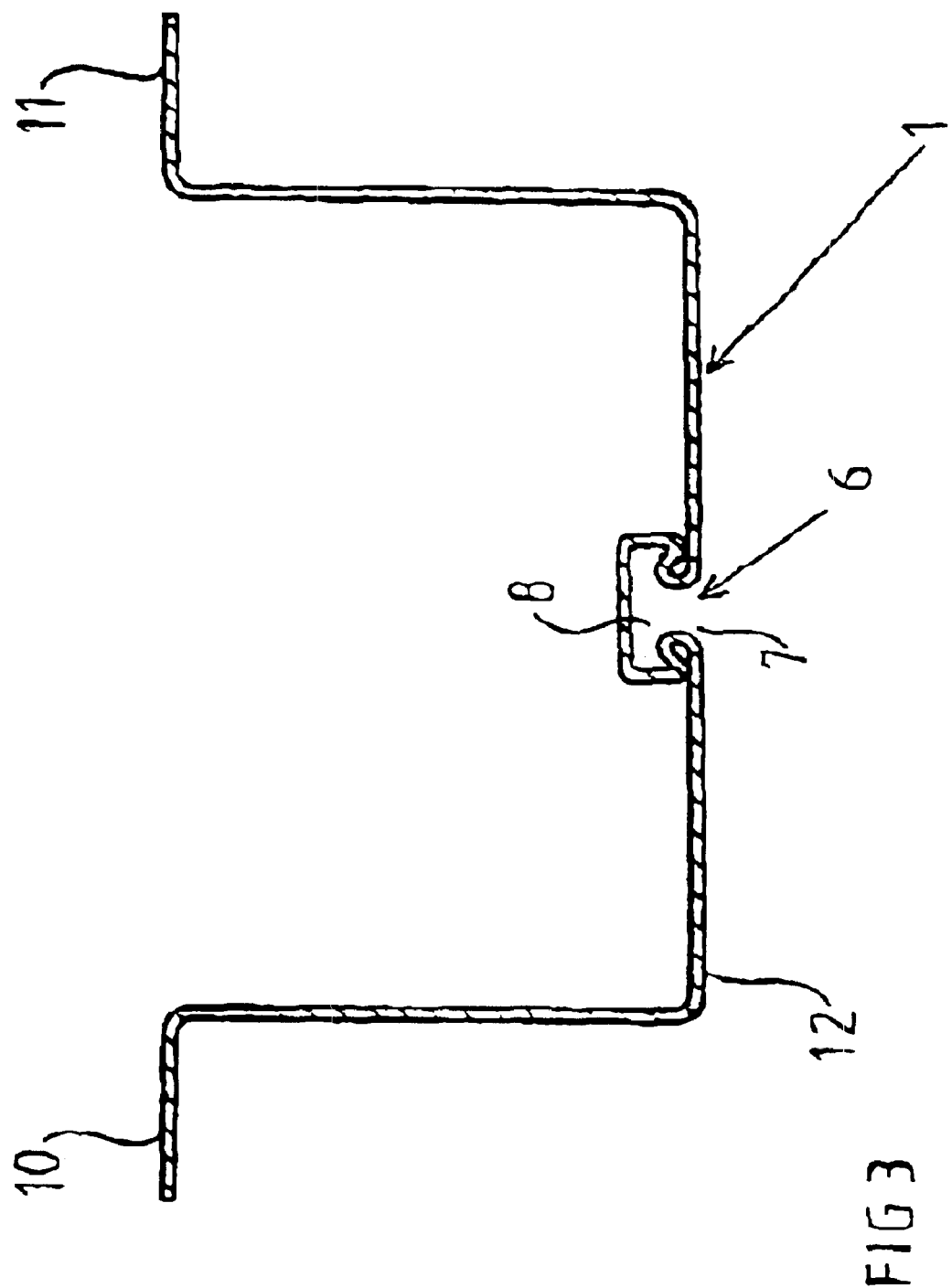
FIG. 3 is a cross-sectional view of a beam according to II—II in FIG. 2.

In the case with beams 1 of rolled sheet, the beams 1 have preferably the cross-sectional shape as can be seen in FIG. 3. The cross-section of the beam is substantially C-shaped. The shape can also be described as similar to an open box, the ends 10, 11, of which are deflected and substantially parallel with a front section 12 of the box. The T-shaped recess 6 is arranged in the front section 12. The ends 10, 11 are preferably attached to floor element 3, side wall element 4, and/or roof element 5 of the car body, in which the beams 1 are arranged. Such a shape promotes an effective mutual fixing of the elements 3–5 and the beams 1. Other possible cross-sectional shapes include Z-profiles, rectangular profiles, etc., which can be provided with the recess 6 according to the invention and work as beams.

The beams 1 extend preferably in a substantially vertical direction and are arranged to support and form a part of the side walls of the car body, but can also be arranged substantially horizontal in order to support and form a part of the side walls, floor and roof of the car body.

Mounting of further components to the beams 1 is done by leading at least a part of such a further component into the recess 6. Said part of such a component may be a standardized attaching element for a standardized profile system, in this case a C-trail system, and include a foot member intended to be led into the recess, and a locking member, such as a nut, for fixing the foot member in the recess, which fixing is known per se. By mounting of further components, such as the ones mentioned above, welding, riveting, screwing, etc. involving any essential deformation of the rails 1 are avoided. Some type of snap connection for fixing said parts of the further components to the beams could be an alternative solution.

A bulge may be arranged in a corresponding way and have a function corresponding to the one of the recess 6. The invention therefore includes also such an accomplishment, although that is not shown in any figure. However, the recesses 6 are preferred.

The invention is advantageous since it allows an easy and cost-effective production of beams 1, which beams obtain a shape allowing fixing further components to the beams 1 by a simple, mutual locking by means of, for instance, means of attachment for standardized profile rail systems. In such a manner, the requirement of welded, riveted, and/or screwed joints in the car body can be considerably reduced, and a better surface finish of wall elements, beams, and further thereto attached components can be obtained. Furthermore, the invention minimizes the need of cutting tooling of beams and makes it possible to attach further components to the beams 1 already before they have been raised and attached to the wall elements 3–5.

It should be comprehended that a plurality of variations of the invention will be obvious to a person skilled within this field without leaving the scope of the invention. The invention shall be limited by what is disclosed in the claims with support of the description and the drawings.

What is claimed is:

1. A car body for a rail vehicle, including a plurality of beams arranged to carry an outer sheet casing of one or more wall elements, wherein at least one of said beams includes an attaching member, which is integral with the beam and which defines a recess extending substantially in a longitudinal direction of the beam, for engagement with at least a part of one or more components intended to be supported by the beam, wherein the beam includes a sheet with a substantially constant thickness, and the attaching member is defined by the shape of the sheet.

2. A car body according to claim 1, wherein the recess has a substantially T-shaped cross-section.

3. A car body according to claim 1, wherein the beam is made of steel or aluminum.

4. A car body according to claim 1, wherein the beam is arranged to support a floor, a side-wall or a roof of the vehicle.

5. A car body for a rail vehicle, comprising:
a plurality of beams at least a portion of which are arranged to carry at least one wall element, wherein at least one of said beams includes an attaching member that is integral with the beam and extends substantially in a longitudinal direction of the beam for engagement with at least a part of at least one component intended to be supported by the beam,
wherein each beam includes a sheet with a substantially constant thickness, and the attaching member is defined by the shape of the sheet.

6. A car body for a rail vehicle, comprising:
a plurality of beams at least a portion of which are arranged to carry at least one wall element; and
an attaching member integral with at least one of the beams, the attaching member extending substantially in a longitudinal direction of the beam, the attaching member being operative to engage at least a portion of at least one component intended to be supported by a corresponding one of the beams,
wherein each beam includes a sheet with a substantially constant thickness, and the attaching member is defined by the shape of the sheet.

* * * * *